United States Patent
Hollister et al.

(10) Patent No.: US 7,190,972 B1
(45) Date of Patent: Mar. 13, 2007

(54) METHOD AND APPARATUS FOR A WIRELESS NETWORK

(75) Inventors: Allen L. Hollister, Scotts Valley, CA (US); Steve C. Evans, Soquel, CA (US)

(73) Assignee: Plantronics, Inc., Santa Cruz, CA (US)

( * ) Notice: Subject to any disclaimer, the term of this patent is extended or adjusted under 35 U.S.C. 154(b) by 513 days.

(21) Appl. No.: 10/425,382

(22) Filed: Apr. 28, 2003

(51) Int. Cl.
*H04B 1/40* (2006.01)
*H04M 1/66* (2006.01)

(52) U.S. Cl. .................. 455/556.1; 455/411; 455/557; 455/88; 455/74.1; 455/554.2

(58) Field of Classification Search ................ 455/411, 455/557, 88, 74.11, 556.1, 552.1, 554.2
See application file for complete search history.

(56) References Cited

U.S. PATENT DOCUMENTS

| | | | |
|---|---|---|---|
| 5,913,163 A * | 6/1999 | Johansson | 455/426.1 |
| 6,865,401 B2 * | 3/2005 | Kotzin | 455/557 |
| 6,882,870 B2 * | 4/2005 | Kivela et al. | 455/567 |
| 2004/0204084 A1 * | 10/2004 | Tan et al. | 455/557 |

FOREIGN PATENT DOCUMENTS

GB          EP001107549 A2 *    6/2001

\* cited by examiner

*Primary Examiner*—Matthew Anderson
*Assistant Examiner*—Yuwen Pan
(74) *Attorney, Agent, or Firm*—Thomas Chuang

(57) ABSTRACT

The present invention provides a solution to the needs described above through a method and apparatus for a wireless network. The network includes a first wireless device and a second wireless device. The first wireless device comprises a transceiver for receiving and transmitting signals utilizing a wireless air interface and communication protocol. The second wireless device is capable of communicating with the first wireless device using the wireless air interface and communication protocol. The second wireless device is further capable of receiving and transmitting signals utilizing an IEEE 802.11 wireless protocol. The network further includes a wired device for communicating with the second wireless device utilizing the IEEE 802.11 wireless protocol.

19 Claims, 6 Drawing Sheets

METHOD AND APPARATUS FOR A WIRELESS NETWORK

TECHNICAL FIELD

The present invention relates to the general field of wireless communications. More specifically the invention relates to a wireless network for use in telecommunications.

BACKGROUND

The digital enhanced cordless telecommunications (DECT) standard is a wireless air interface and communication protocol designed to provide wireless communications for telecommunications equipment such as cordless phones. The DECT standard is promulgated by the European Telecommunications Standards Institute. It operates in the 1.8 GHz radio band, employing Time Division Multiple Access (TDMA) technology. DECT operates at speeds of 2 Mbps and is ideal for use in voice applications. DECT offers the advantages of low power consumption, enabling smaller batteries to be used in a wireless headset.

The use of Wireless Local Area Networks (WLANs) has recently increased. In particular, the IEEE 802.11 series of WLAN specifications have gained widespread acceptance. IEEE 802.11 wireless LAN's are becoming pervasive throughout the industry. It is desirable to be able to use IEEE 802.11 ("802.11") standardized networks to transmit voice either within an enterprise (intranet) or over a wider area (internet) using VoIP technologies or converging the LAN with the telephony system within a company to provide wireless access to the public switched telephone network (PSTN) system. In addition, many applications exist for a wireless voice connection of high quality to a PC for a variety of applications.

The IEEE 802.11 wireless LAN standard addresses the basic transport of LAN data over a wireless medium. There are currently three variations of 802.11: IEEE 802.11a (5 GHz, 54 Mbps), IEEE 802.11b (2.4 GHz, 11 Mbps), and IEEE 802.11g (2.4 GHz, 54 Mbps). Streaming media applications, such as voice communication require a reliable and predictable data stream. Such reliability and predictability is provided by the ability to classify traffic and prioritize time-sensitive classes of traffic, referred to as QoS (Quality of Service). QoS is addressed by 802.11e. It includes more effective channel management, provides better power management for low power devices, specifies a means to set up side links to other 802.11 devices while simultaneously communicating with an 802.11 AP, and provides improvements to the polling algorithms used by access points.

Referring to FIG. 5, a prior art 802.11 LAN is illustrated. A distribution system 502, also referred to as a backbone, is used to forward frames to their destination when several access points are connected to form a large coverage area, requiring communication between each access point to track the movements of mobile stations. In many embodiments Ethernet is utilized. Access points 504, 506 act as bridges between the wireless world and the wired world. Each access point has at least two network interfaces: a wireless interface that understands 802.11 and a second interface with wired networks. Typically, the wired interface is an Ethernet port and/or WAN port. Access points typically have a TCP/IP interface. Stations 508, 510 are computing devices with wireless network interfaces, typically laptops or hand-held computers. Stations 508, 510, can also be computers not intended to be portable, such as desktops. Wireless medium 512 is utilized to move frames from stations 508, 510 to access point 504, 506 with radio frequency layers being used in typical embodiments.

However, the use of 802.11 directly to transmit voice between a wireless telephonic device, such as a wireless headset, and an access point is problematic. 802.11 requires higher power relative to lower power RF protocols such as DECT, necessitating the use of large batteries that add to the weight, space, and size of the headset. In order to implement 802.11 in a headset, power issues become paramount. It is difficult to make a headset that is wearable while retaining high QoS because of these problems. In addition, there usually is not enough space on the headset proper to fit dial pads. Range vs. density is an issue with present day systems. It is desirable to have as much range as possible; in fact, it is desirable to be able to wander anywhere in a building or buildings and be able to continue a conversation. By their very nature, it is not possible to obtain substantial range (e.g., greater than 50 to 100 meters) without transmitting a lot of power (which rapidly bumps into limits placed on total power by the FCC). This in its self limits range. Furthermore, as one uses more power to get range, then the bandwidth available (allocated bandwidth by the FCC or other governmental agency) becomes insufficient to support all of the traffic from multiple users. Thus, the range vs. density problem arises. If more range is desired, then fewer users can be accommodated because of interference issues.

The range vs. density problem is usually not solved with standard cordless systems without special hardware. The use of cells and roaming is the classical way that this problem is solved and is done extensively by the cell phone industry. When density becomes too great, more cell sites are added and the power from any one transmitter is reduced. This preserves the range (through roaming) and increases density because power is reduced which reduces interference. The 802.11 system inherently provides roaming capability so a voice data system based on 802.11 can solve this problem.

However, the use of 802.11 in a wireless telephonic device such as a headset is problematic. The use of an 802.11 link in a telephonic device such as a headset has the problem of requiring a very large battery in the headset to support normal talk times. Audio quality is usually compromised because of the need for battery conservation. For example, one battery conservation solution currently used is to buffer up to 40 msecs of data, and then "blast" it out in about 4 msecs. The power is then turned off for 36 msec saving a considerable amount of power. However, this is done at the expanse of adding 36 msec of delay. From a QoS point of view, this is undesirable. Power problems are even greater for higher bit rate 802.11a and 802.11g relative to 802.11b.

In addition, if one wanted to get audio into a computer, it would have to go through at least two hops; one from the headset to an access point, and another from the access point back to the computer. This also adds undesirable delay. It also doubles the required number of bits, reducing network capacity and thereby decreasing density capability. Although Ad hoc links are possible, they are not usually supported for other reasons.

Thus, there has been a need for improvements in wireless network architectures and the use of wireless telephonic devices. More specifically, there has been a need for improved systems and methods for the use of 802.11 wireless networks and wireless telephonic devices.

SUMMARY OF THE INVENTION

The present invention provides a solution to the needs described above through an apparatus and method for a wireless network.

The present invention provides for a wireless communications network. The network includes a first wireless device and a second wireless device. The first wireless device comprises a transceiver for receiving and transmitting signals utilizing a wireless air interface and communication protocol. The second wireless device is capable of communicating with the first wireless device using the wireless air interface and communication protocol. The second wireless device is further capable of receiving and transmitting signals utilizing an IEEE 802.11 wireless protocol. The network further includes a wired device for communicating with the second wireless device utilizing the IEEE 802.11 wireless protocol.

The present invention further provides a dual mode apparatus capable of converting between an IEEE 802.11 wireless protocol and a different wireless air interface and communication protocol. The apparatus includes an antenna for receiving and transmitting signals, a receiver capable of receiving signals transmitted with the wireless air interface and communication protocol, and a transmitter capable of transmitting signals with the wireless air interface and communication protocol. The apparatus further includes a receiver capable of receiving signals with the IEEE 802.11 wireless protocol and a transmitter capable of transmitting signals with the IEEE 802.11 wireless protocol. The apparatus further includes a digital signal processor for converting signals between the wireless air interface and communication protocol and the IEEE 802.11 wireless protocol.

The invention further provides an apparatus capable of converting between an IEEE 802.11 wireless protocol and a different wireless air interface and communication protocol. The apparatus includes a computer and a device coupled to the computer. The device includes an antenna for receiving and transmitting signals, a receiver capable of receiving signals transmitted with the wireless air interface and communication protocol, and a transmitter capable of transmitting signals with the wireless air interface and communication protocol. The device further includes a receiver capable of receiving signals with the IEEE 802.11 wireless protocol and a transmitter capable of transmitting signals with the IEEE 802.11 wireless protocol. The device further includes a digital signal processor for converting signals between the wireless air interface and communication protocol and the IEEE 802.11 wireless protocol.

The present invention provides a method for linking a wireless device to an IEEE 802.11 standardized network. A wireless link is between a first and second wireless device with a wireless air interface and communication protocol. A pulse code modulated audio signal comprising voice data packets is transmitted from the first wireless device to the second wireless device utilizing the wireless air interface and communication protocol. The voice data packets are transcoded to VoIP packets and the VoIP packets are prepared to be transmitted with the IEEE 802.11 wireless protocol. The VoIP packetized data is transmitted from the second wireless device to a wired device using the IEEE 802.11 wireless protocol.

The present invention further provides a method for linking a wireless device to an IEEE 802.11 standardized network. VoIP packets transmitted with the IEEE 802.11 wireless protocol are received. The VoIP packets are transcoded to a pulse code modulated audio signal comprising voice data packets utilizing a wireless air interface and communication protocol. A wireless link is established between a first and second wireless device with a wireless air interface and communication protocol. The pulse code modulated audio signal comprising voice data packets is transmitted utilizing the wireless air interface and communication protocol to a wireless device.

DESCRIPTION OF THE DRAWINGS

The features and advantages of the apparatus and method of the present invention will be apparent from the following description in which.

DETAILED DESCRIPTION OF THE PREFERRED EMBODIMENTS

The present invention provides a solution to the needs described above through an apparatus and method for a wireless network. The invention utilizes a power efficient cordless telephony standard such as DECT in conjunction with 802.11 networking to provide a wireless link to a wireless headset, handset, or other wireless telephonic device. Although the embodiments described herein may reference a wireless headset, the invention may be used with any wireless telephonic device and any such reference to a wireless headset is intended to also encompass other wireless telephonic devices.

Still other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

Figure 1:
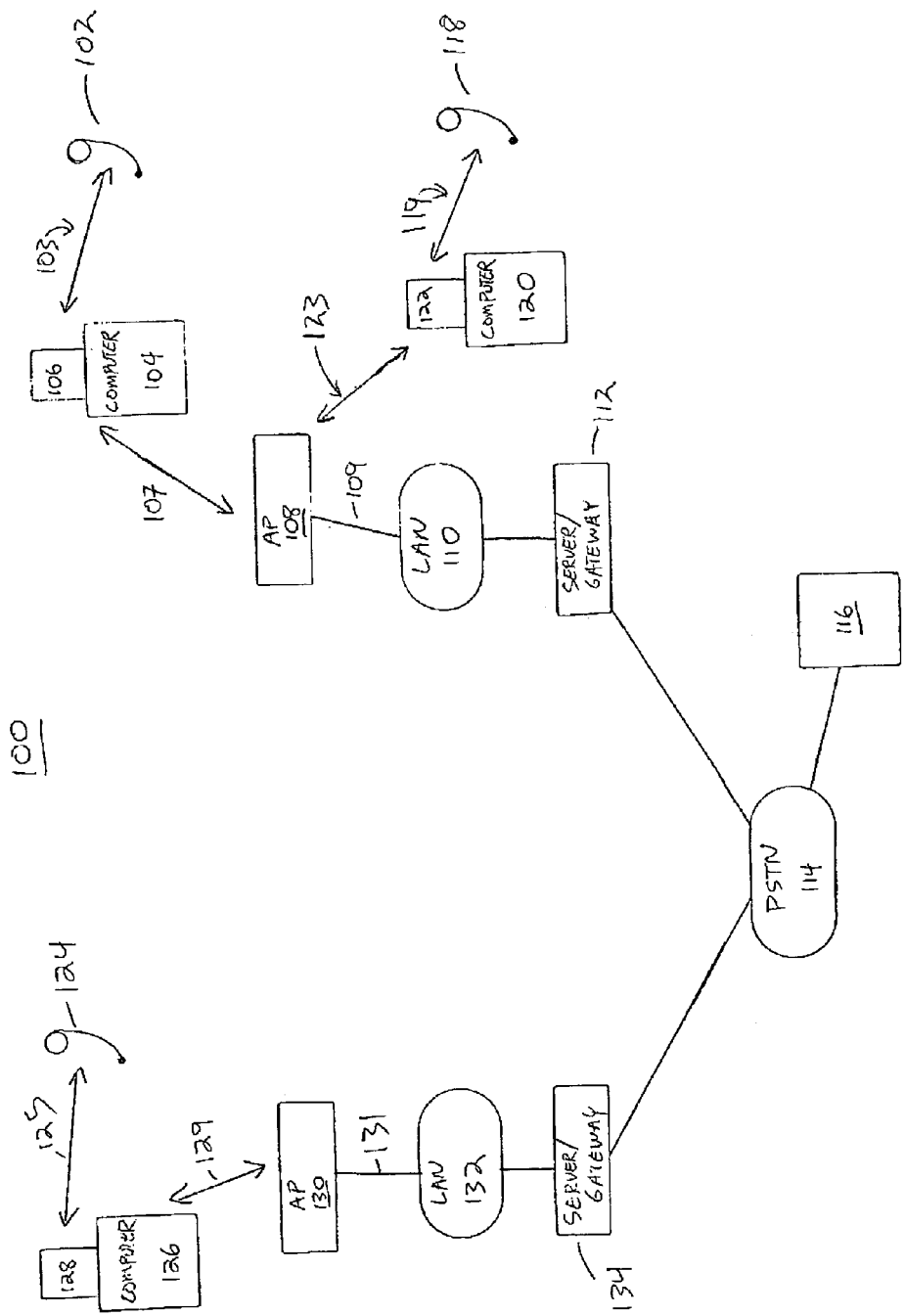
FIG. 1 is a diagram illustrating the use of an embodiment of the invention in a telephonic network.

Referring to FIG. 1, diagram of a basic configuration utilizing an embodiment of the invention in a system for a wireless link to a headset is shown. A high quality RF link is used to establish a link with an 802.11 device that resides at a location remote from the headset. The location could be an 802.11 access point or other device, such as an 802.11 card capable of operation with a computer device. The computer device is a dual mode RF processing system that provides both 802.11 service and the high quality RF link service. Voice data from the headset is placed on an 802.11 wireless network for transmission to wherever needed. Battery requirements remain low in the headset. Using this technique, the 802.11 power requirement is moved to the PDA or PC where more power is available. Quality of Service (QoS) is improved as shorter packet sizes can be accommodated without impacting power in the headset. This results in less delay and jitter. In addition, high quality data 32 bit ADPCM could be accommodated if desired.

The system 100 includes a wireless headset 102, DECT link 103, and computer device 104. Computer device 104 includes a dual mode conversion device 106 for implementing DECT and 802.11 conversion. An 802.11 link 107 is provided between computer device 104 and 802.11 access point (AP) 108. 802.11 access point 108 is connected to LAN cloud 110 via wired line 109. The system may further include a server/gateway 112 provided between LAN cloud 110 and conventional PSTN node 114. A telephonic device 116 is connected to PSTN node 114.

Although a low power DECT link 103 is shown, the link between wireless headset 102 and computer device 104 may be any high quality RF link. In an embodiment of the invention, the high quality RF link requires lower power than an 802.11 link. Such links include RF links such as the Ultrawideband (UWB) system, which uses a very wide frequency band at a very low power level in the regulated bands. A Bluetooth link to 802.11 is also possible, but audio quality may be of lower quality and interference issues arise since Bluetooth operates at the same frequency as 802.11.

The system 100 may further include a second headset 118, DECT link 119, and computer device 120. Computer device 120 includes a conversion device 122 for implementing DECT and 802.11 conversion. An 802.11 link 123 is provided between computer device 120 and AP 108. Headset 102 and headset 118 both utilize 802.11 access point 108 and are therefore within a proximate geographic distance from each other defined by the 802.11 parameters.

The system 100 may include a headset device 124 at a location remote from headset 102 and headset 118. A DECT link 125 is provided between headset 124 and computer device 126. Computer device 126 includes a wireless link interface and conversion device 128 for implementing DECT and 802.11 conversion. 802.11 link 129 is provided between computer device 126 and an 802.11 access point 130. 802.11 access point 130 is connected to LAN cloud 132 via wired line 131. The system further includes a server/gateway 134 provided between LAN cloud 132 and conventional PSTN node 114. One of ordinary skill in the art will recognize that other DECT and 802.11 architectures may be employed for the system by changing the position of one or more of the various system elements.

Wireless headsets 102, 118, and 124 may be boomless or include a short or regular length boom. As described above, any wireless hands free device, handset or other telephonic device may be used in the invention in place of a wireless headset. Wireless headsets 102, 118, and 124 include a DECT transmitter and DECT receiver (the combination referred to as a DECT transceiver) for transmission and reception of audio or data over a DECT link. Wireless headsets 102, 118, and 124 contain a microphone input for receiving a voice input and an audio speaker for outputting a voice output.

In an embodiment of the invention, computer devices 104, 120, and 126 are mobile computing devices such as personal digital assistants (PDAs) or notebook computers. Use of a mobile device allows the computer device to moved anywhere within usable range of an 802.11 access point. In an alternative embodiment of the invention, computer devices 104, 120, and 126 may be desktop computers.

In an embodiment of the invention, conversion device 106, 122, and 128 for implementing DECT and 802.11 conversion is a Personal Computer Memory Card International Association (PCMCIA) card capable of being inserted in a PDA or notebook computer. In a further embodiment, conversion device 106, 122, and 128 are implemented as a USB or peripheral component interconnect (PCI) device.

Furthermore, conversion device 106, 122, and 128 can be integrated with an 802.11 access point, providing a complete DECT roaming system implemented at the same time the 802.11 access points are installed. In this embodiment, dialing and other control is handled by voice recognition.

Figure 2:
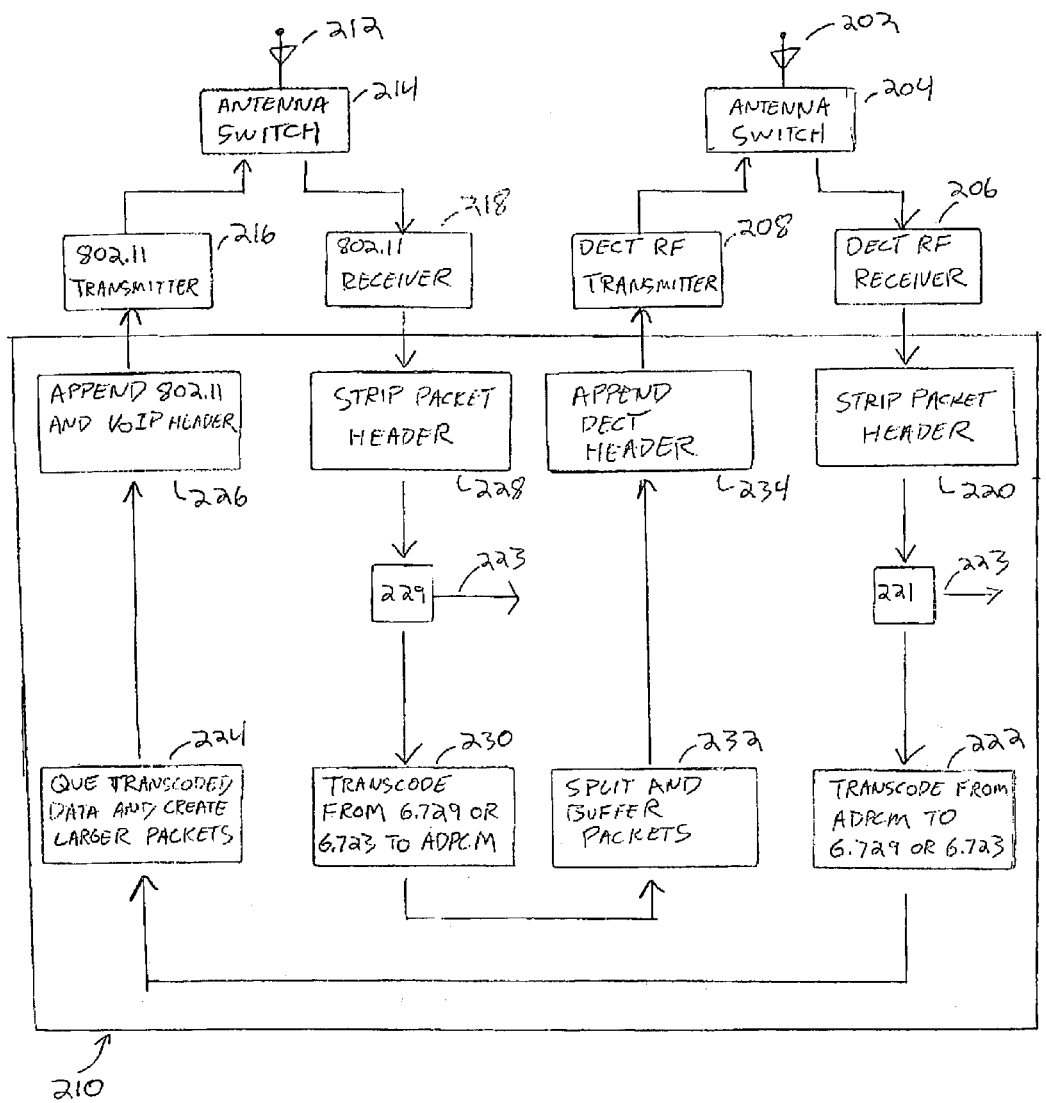
FIG. 2 is a diagram illustrating a device for implementing DECT and 802.11 conversions.

Conversion device 106, 122, 128 is capable of data translation/transcoding from one standard to another. Referring to FIG. 2, a diagram illustrating a device 200 for implementing DECT and 802.11 conversion is shown. The conversion device 200 of the present invention may be constructed using discrete components, such as PCMCIA cards and digital signal processing (DSP) chips (and associated filters, A/D and D/A converters, power supplies, etc.). For simplicity of explanation, only a subset of elements is shown.

An antenna 202 is coupled to a DECT RF receiver 206 and DECT RF transmitter 208 via antenna switch 204. DECT RF receiver 206 and DECT RF transmitter 208 may operate at either 1.8 GHz or 900 MHz. DECT RF receiver 206 and DECT RF transmitter 208 are coupled to a digital signal processor 210 which performs conversion processes between 802.11 and DECT (either from 802.11 to DECT or from DECT to 802.11). An antenna 212 is connected to an 802.11 RF transmitter 216 and an 802.11 RF receiver 218. In an embodiment of the invention, 802.11 RF transmitter 216 and 802.11 RF receiver 218 are implemented as a transceiver. The transmitter components of a direct sequence network include a physical-layer convergence procedure (PLCP), spreader, transmit mask filter, and DBPSK/DQPSK modulator. The receiver components include a correlator, DBPSK/DQPSK demodulator, descrambler, and PCLP. 802.11 RF transmitter 216 and 802.11 RF receiver 218 are coupled to digital signal processor 210.

802.11 chipmakers include Intersil, Agere (Lucent), and Texas Instruments. Digital Signal processor 210 is capable of being programmed to handle multiple radio technologies and standards, and is a field programmable gate array (FPGA) digital signal processor in one embodiment of the invention. Manufacturers of 802.11 interface cards include Nokia and Symbol. Manufacturers of 802.11 access points include Orinco (e.g., AP 1000 Access Point) and Nokia (e.g., A032 Access Point). Much of the hardware on an 802.11 device is shared on the conversion device, resulting in cost savings. For example, one DSP processor would be used for both 802.11 processing as well as RF link (DECT) processing, transcoding, etc. Additional hardware to be added to the conversion device would include the RF link transceiver.

Antenna 212 may be either omnidirectional, bidirectional, or unidirectional. In an embodiment of the invention, antenna 212 is an omnidirectional in order to cover a large area. In an alternative embodiment, a directional antenna may be used to increase transmission distance, concentrate the signal in a given area, and limit the quantity of signal escaping from a desired area.

Figure 3A:
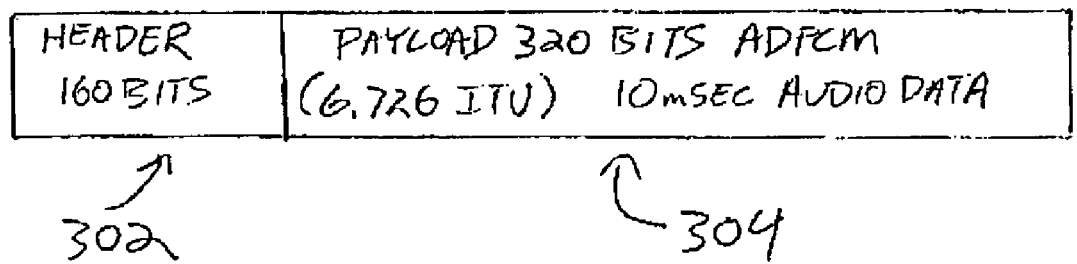
FIG. 3A is a diagram illustrating a DECT packet.

The speech of a user of a wireless headset 102 is converted to DECT packets and transmitted by a DECT transmitter at the headset to DECT RF receiver 206. Referring to FIG. 3A, a diagram illustrating a DECT packet is shown. DECT packet 300 comprises a header portion 302 and a payload portion 304. Header portion 302 is 160 bits in length. Payload portion 304 is 320 bits and provides for recording of 10 msec of audio data. DECT packet 300 occupies a timeslot of 416.17 microseconds.

Figure 3B:
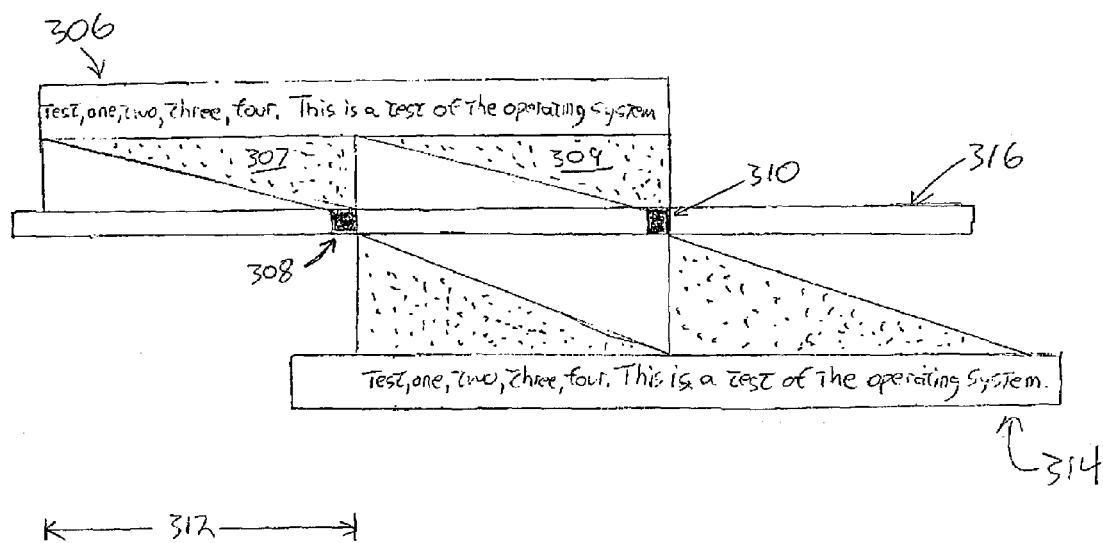
FIG. 3B illustrates transmission of audio data using DECT packets.

Referring to FIG. 3B, transmission of audio data using DECT packets is illustrated. A portion of audio 306 comprising the sentence "Test, one, two, three, four. This is a test of the operating system". A DECT packet 308 with a payload of 320 bits is created by sampling 10 ms of audio data 307 at a rate of 32K ADPCM. The sampled data is encoded and compressed for transmission. In the present example (not representative of real time), 10 ms of audio includes the audio "Test, one, two, three, four. This is". A 10 ms delay 312 exists between the time that a headset user begins speaking and the time that DECT packet 308 is transmitted via a DECT radio carrier link 314. DECT packet 308 is transmitted in a timeslot 316 of 416.17 microseconds. Upon formation of the first DECT packet 308, the next 10 ms of audio data 309 is sampled to form DECT packet 310. In the present example, the next 10 ms of audio data includes the audio "a test of the operating system". Additional timeslots 316 are available for packets sent to the headset user as well as other DECT voice channels.

In an embodiment of the invention, DECT packets 308 and 310 are converted to an 802.11 packet by a conversion device 106 and reconverted to DECT packets prior to transmission to a second user headset. Upon receipt of DECT Packets 308 and 310, a DECT receiver at a second user headset decodes the packets and converts the digitized signal back into audio signal 314, reproducing audio signal 306.

Referring to FIG. 2, steps performed by digital signal processor 210 in implementing DECT and 802.11 conversion is shown. Steps 220 to 226 implement conversion of a DECT packet to an 802.11 packet in an embodiment of the invention. Steps 228 to 234 implement conversion of an 802.11 packet to a DECT packet.

At step 220, upon receipt of a DECT packet 300 from DECT RF receiver 206, the packet header 302 is stripped to obtain only the packet payload 304. At step 222, the packet payload 304 is trandscoded from 32K bit ADPCM used by DECT to a desired compression required by a VoIP session.

In an embodiment of the invention, the voice data is transcoded to G.729 or G.723, coding scheme standards promulgated by the International Telecommunication Union Telecommunication Standardization Sector (ITU-T). G.729 describes a code excited linear prediction compression (CELP) compression that enables voice to be coded into 8 Kbps stream. Two variations of G.729 exist (G.729 and G.729 Annex A), differing in computational complexity, with both providing speech quality comparable to that of 32 Kbps ADPCM.

G.723 describes a compression technique that is used to compress speech at a low bit rate as part of the H.324 standards family. G.723 is associated with two bit rates: 6.3 Kbps based on multilevel quantization (MP-MLQ) technology and lower quality 5.3 Kbps based on CELP. Other voice coding standards include G.711, G.726, and G.728. Using G.729, a speech sample is generated every 10 ms. The number of speech samples per VoIP packet can be varied. However, because G.729 utilizes 10 ms speech samples, each increase in samples per frame increases the delay by 10 ms. ITU-T G.115 recommends that no more than 150 ms of one way, end-to-end delay should occur in order to maintain good voice quality.

In a further embodiment of the invention, conversion device 106 may route the packet payload using a multiplexing function 221 to the computer device via a data bus 223 in addition to transcoding at step 222 on digital signal processor 210. Computer device 222 may operate software capable of performing additional processing of the packet payload 304. Utilizing a high quality link such as DECT, the resultant audio quality is sufficient for a computer application, such as voice recognition. Implementing the conversion device onto a PCMCIA card allows for the convenient ability to route the packet payload to the computer device. A second hop is eliminated, resulting in more efficient bandwidth utilization as well as less delay and higher audio quality. A further advantage is that the PCMCIA card can be moved between computer devices, moving the functionality with the card. At step 224, the transcoded voice data is queued into larger packets prior to transmission by 802.11 RF transmitter 216. In an embodiment of the invention, four transcoded DECT packets are combined to create a packet comprising 40 ms of audio data.

In an alternative embodiment, the conversion device is integrated with an 802.11 access point. A complete DECT network could then be created with one set of access points. In this embodiment, voice recognition is used for commands if a headset is utilized.

Upon receipt of each transcoded packet, the data is buffered in a queue until four packets have been received. At step 226, upon buffering of 4 packets, 802.11 transmitter baseband processing is performed. An 802.11 and VoIP header (RTP/UDP/IP packet header) are appended to the 802.11 packet and the packet is prepared for transmission by 802.11 RF transmitter 216. Those of ordinary skill in the art will appreciate that the inventive concepts described herein apply equally well to VoIP packets of varying length and is not limited to packets corresponding to 40 ms of audio data.

Conversion device 106 provides for data from the headset to be buffered into a queue that is later transmitted over the 802.11 link. Timing and synchronizing is provided in order to keep the data flowing seamlessly from the headset to the 802.11 link with low delay and jitter. Because the need for power is concentrated at computer device 108 rather than at headset 102, it is possible to transmit shorter packets, thereby reducing delay and improving QoS, without impacting battery size on the headset. Data from the headset is buffered in a jitter buffer or queue at conversion device 106 or computer device 104 in order to eliminate jitter. In the present example, the packet size can be reduced to 10 msec because more power can be tolerated at computer device 104, reducing transmission delay relative to prior art systems. The DECT packets are stored in the buffer until the 802.11 system is ready to transmit them. Data is passed seamlessly over the system with the largest delay being the 40 msec.

The ability to prioritize data traffic can be implemented by using a polling scheme of the high QoS traffic and assigning known time slots for this data. In this embodiment, the 802.11 access point is the master timer. This has the advantage that other devices of this type would not interfere with each other as they would be assigned their own time slot. Collisions would not occur under this scheme. In an embodiment of the invention, where the low power RF link is synchronized to the 802.11 system jitter occurs only when a long message, such as a print job, used a very large packet and ran at the slowest possible bit rate. Under this circumstance, jitter of up to a few msec would be possible. This amount of jitter is small and has little degradation on audio. In an embodiment where the timing between 802.11 and the RF link is not synchronized, a jitter buffer is utilized. If the data rates between the systems are at lease even multiples of each other, then the jitter buffer serves to store data from the low power RF link until the 802.11 system is ready to re-transmit it. It does so at the expense of additional delay which, although undesirable, is preferable than having time jitter on the signal. In an alternative embodiment, the master timing is controlled by the low power RF system. In this case the RF links would synchronize the 802.11 system.

In this system, because there is more power available to a PDA or PC, it is possible to reduce the size of the packets on the 802.11 link. This reduces delay, further improving QoS. In addition, because more power is required to send more bits, it is possible to send 32 Kb/s instead of a compressed version of 8 Kb/s as is presently done to conserve power. This also improves the audio quality. If it is desired to route the data from a headset directly into a PC or PDA, then this system would always provide high quality audio as it is native to the low power link if DECT is used.

During bi-directional communication, an 802.11 RF receiver 218 receives VoIP packets corresponding to voice data from a second user. At step 228, 802.11 receiver baseband processing is performed on the received VoIP packet. This baseband processing includes stripping of the packet header to obtain a voice data packet. At step 230, the packet payload 304 is trandscoded from the compression used by the VoIP session to 32K bit ADPCM used by DECT. In an embodiment of the invention, the voice data is transcoded from G.729 or G.723. In a further embodiment of the invention, the voice data may be routed by a multiplexing function 229 to the computer device via a data bus in addition to transcoding at step 230 on digital signal processor 210. The computer device may perform additional processing of the voice data packet. At step 232, the transcoded voice data is split into 320 bit packets comprising 10 ms of audio data required by DECT transmitter 208 and queued for transmission by DECT RF transmitter 208. At step 234 DECT transmitter baseband processing is performed. A 160 bit DECT header is appended to the 320 bit voice packet and the packet is prepared for transmission by DECT RF transmitter 208.

Figure 4:
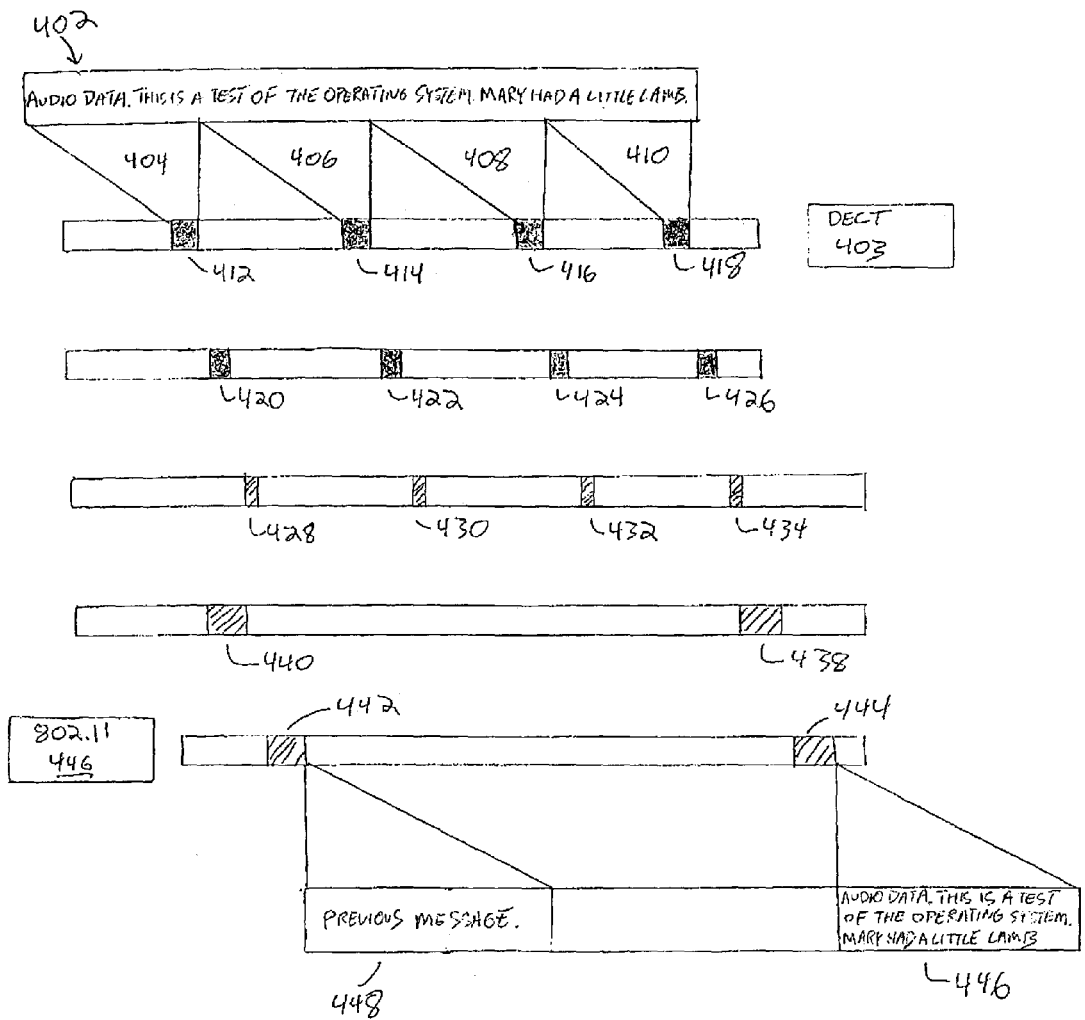
FIG. 4 is a diagram illustrating the conversion of a DECT packet to an 802.11 packet for transmission.
Figure 5:
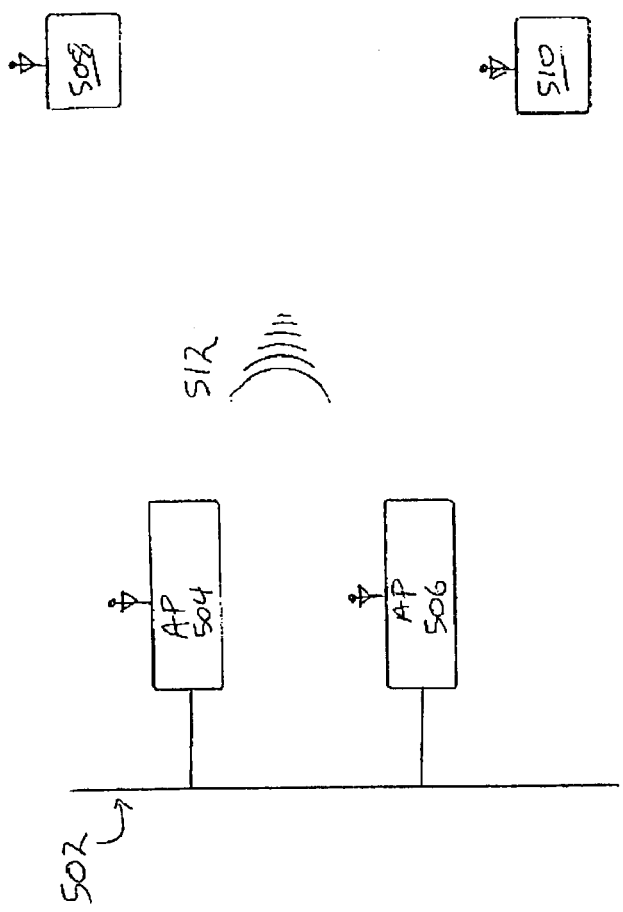
FIG. 5 is a diagram illustrating the components of a prior art 802.11 system.

Referring to FIG. 4, a diagram illustrating the conversion of multiple DECT packets to an 802.11 packet is shown. A portion of audio 402 comprising the words "Audio data. This is a test of the operating system. Mary had a little lamb" is to be converted (example not representative of real time). Audio 402 is sampled in 10 ms increments 404, 406, 408, and 410 to create DECT packets 412, 414, 416, and 418. As described above a 10 ms delay exists between the time that a headset user begins speaking and the time that DECT packet is transmitted via a DECT radio carrier 403. Additional 10 ms delays occur between transmission of each DECT packet 414, 416, and 418.

Upon receipt of a DECT packet from the DECT RF receiver, digital signal processor 210 strips the header of each packet, leaving only 320 bit voice packets 420, 422, 424, and 426. Upon receipt, each 320 bit voice packet is transcoded from 32K bit ADPCM used by DECT to a desired compression required by a VoIP session. For G.729, the voice data is compressed to 80 bit voice data packets 428, 430, 432, and 434. Digital signal processor 210 queues each packet 428, 430, 432, and 434 until 40 ms of audio data are collected to form a 320 bit packet 438. Packet 442 is a 320 bit packet representing a previous 40 ms of audio data. A 40 ms delay 436 is present between packet 440, packet 438, and each subsequent 320 bit packet. VoIP and 802.11 header information is added to packet 440 and packet 438 to form packets 442 and 444 that are transmitted via 802.11 radio carrier 446. In an embodiment of the invention, VoIP and 802.11 header data comprise 592 bits of MAC and VoIP data. At a listener end, packet 444 is received and decoded to provide audio 446, reconstructing audio 402. Packet 442 is received and decoded to provide audio 448, corresponding to the previous 40 ms of audio data.

The range vs. density issue is nicely solved with the herein described system. If the low power RF link is on a different frequency from the 802.11 link more bandwidth is available, i.e. there are fewer bits traveling over the actual 802.11 link since there is only one link. Furthermore, if the conversion device is implemented with a PDA or notebook computer, in an embodiment of the invention, the actual range of the low power RF link can be designed to be small, 5 to 10 ft for example, since the PDA or notebook computer is the dial pad and is likely to be used close to the headset. As a result, the power can be turned down dramatically on the low power RF link making for a very high degree of bandwidth reuse with no interference from other users. Implementation costs can be reduced since an RF power amp is no longer needed. Experimental results indicate that a headset operating only with an 802.11 link requires a 260 ma-hr battery in order to provide approximately four hours of talk time, while a DECT headset link used in conjunction with an 802.11 link can achieve approximately eight hours of talk time using a 160 ma-hr battery.

Having described the invention in terms of a preferred embodiment, it will be recognized by those skilled in the art that various types of components may be substituted for the configuration described above to achieve an equivalent result. It will be apparent to those skilled in the art that modifications and variations of the described embodiments are possible, and that other elements or methods may be used to perform equivalent functions, all of which fall within the true spirit and scope of the invention as measured by the following claims.

The invention claimed is:

1. A wireless communications network comprising:
a first wireless device comprising a first transceiver for transmitting or receiving a first DECT packet using a DECT protocol;
a first computer comprising:
a first processor, wherein the first processor transcodes the first DECT packet to a first transcoded packet having a desired compression required by a VoIP session, buffers the first transcoded packet, combines a first plurality of buffered transcoded packets into a first single transcoded packet, and appends IEEE 802.11 header and VoIP header information to the first single transcoded packet;
a first DECT transceiver, wherein the first computer is capable of communicating with the first wireless device using the DECT protocol; and
a first IEEE 802.11 transceiver, wherein the first computer is capable of communicating with a wired device using an IEEE 802.11 protocol;
a second wireless device comprising a second transceiver for transmitting or receiving a second DECT packet using the DECT protocol;
a second computer comprising:
a second processor, wherein the second processor transcodes the second DECT packet to a second transcoded packet having a desired compression required by a VoIP session, buffers the second transcoded packet, combines a second plurality of buffered transcoded packets into a second single transcoded packet, and appends IEEE 802.11 header and VoIP header information to the second single transcoded packet;
a second DECT transceiver, wherein the second computer is capable of communicating with the second wireless device using the DECT protocol; and
a second IEEE 802.11 transceiver, wherein the second computer is capable of communicating with the wired device using the IEEE 802.11 protocol, wherein the wired device receives the first single transcoded packet from the first computer and receives the second single transcoded packet from the second computer.

2. The wireless communications network of claim 1, wherein the first DECT packet and second DECT packet correspond to approximately 10 msec of audio data.

3. The wireless communications network of claim 2, wherein the first single transcoded packet contains data corresponding to four DECT packets such that a system transmission delay is equal to 40 msec.

4. The wireless communications network of claim 1, wherein the first wireless device is a first headset and the second wireless device is a second headset.

5. The wireless communications network of claim 1, wherein the first computer is a first personal digital assistant or the second computer is a second personal digital assistant.

6. The wireless communications network of claim 1, wherein the first computer is a first notebook computer or the second computer is a second notebook computer.

7. The wireless communications network of claim 1, wherein the first processor, first DECT transceiver, and first IEEE 802.11 transceiver are disposed on a PCMCIA card.

8. The wireless communications network of claim 1, wherein the second processor, second DECT transceiver, and second IEEE 802.11 transceiver are disposed on a PCMCIA card.

9. The wireless communications network of claim 1, wherein the wired device is an IEEE 802.11 access point coupled to a wired network.

10. The wireless communications network of claim 1, wherein the wired device is an IEEE 802.11 access point coupled to a LAN.

11. The wireless communications network of claim 10, further comprising gateway equipment for transferring information between the LAN and a PSTN or a cellular communication network.

12. A method for linking a headset to an IEEE 802.11 standardized network comprising:
   establishing a wireless link between a headset and a computer with a DECT protocol;
   transmitting a DECT packet comprising approximately 10 ms of audio data utilizing the DECT protocol from the headset to the computer;
   transcoding the DECT packet to a transcoded packet having a desired compression required by a VoIP session;
   buffering the transcoded packet;
   combining a plurality of buffered transcoded packets into a single transcoded packet;
   appending an IEEE 802.11 header and a VoIP header information to the single transcoded packet; and
   transmitting the single transcoded from the computer to a wired device using an IEEE 802.11 wireless protocol.

13. The method of claim 12, wherein transcoding the DECT packet to a transcoded packet comprises using a G.729 or G.723 coding scheme.

14. The method of claim 12, wherein transcoding the DECT packet to a transcoded packet is performed at a PCMCIA card.

15. A method for linking a headset to an IEEE 802.11 standardized network comprising:
   receiving at a wireless computer a VoIP packet transmitted with an IEEE 802.11 wireless protocol;
   transcoding the VoIP packet to a pulse code modulated audio signal packet;
   dividing the pulse code modulated audio signal packet into a plurality of smaller voice data packets;
   appending a DECT header to each of said plurality of smaller voice data packets;
   establishing a wireless link between a headset and the wireless computer with the DECT protocol; and
   transmitting the plurality of smaller voice data packets from the wireless computer to the headset using a DECT protocol.

16. The method of claim 15, wherein the VoIP packet is transcoded to 32K bit ADPCM.

17. The method of claim 15, wherein dividing the pulse code modulated audio signal packet into a plurality of smaller voice data packets comprises dividing the pulse code modulated audio signal packet into 320 bit packets comprising 10 ms of audio data.

18. The method of claim 15, wherein the wireless computer is a personal digital assistant.

19. The method of claim 15, wherein the wireless computer is a notebook computer.

* * * * *